US009215753B2

(12) United States Patent  
Josso et al.

(10) Patent No.: US 9,215,753 B2
(45) Date of Patent: Dec. 15, 2015

(54) MULTI SIM MANAGEMENT (71) Applicant: ST-Ericsson SA, Plan-les-Ouates (CH)

(72) Inventors: Nicolas Josso, La Chapelle Saint Fray (FR); Erwan Preteseille, Arnage (FR); Sylviane Roullier, Le Mans (FR)

(73) Assignee: ST-ERICSSON SA, Plan-Les-Ouates (CH)

( * ) Notice: Subject to any disclaimer, the term of this patent is extended or adjusted under 35 U.S.C. 154(b) by 79 days.

(21) Appl. No.: 14/138,387

(22) Filed: Dec. 23, 2013

(65) Prior Publication Data

US 2014/0106747 A1 Apr. 17, 2014

Related U.S. Application Data (63) Continuation of application No. 13/993,865, filed as application No. PCT/EP2011/073677 on Dec. 21, 2011, now abandoned.

(60) Provisional application No. 61/439,426, filed on Feb. 4, 2011.

(30) Foreign Application Priority Data

Dec. 30, 2010 (EP) .................................. 10306538

(51) Int. Cl.
*H04W 4/00* (2009.01)
*H04W 88/06* (2009.01)
*H04W 36/14* (2009.01)
*H04W 8/20* (2009.01)

(52) U.S. Cl.
CPC .............. *H04W 88/06* (2013.01); *H04W 36/14* (2013.01); *H04W 8/205* (2013.01)

(58) Field of Classification Search
CPC ............................... H04W 48/18; H04W 88/06
See application file for complete search history.

(56) References Cited

U.S. PATENT DOCUMENTS

2003/0125073 A1  7/2003  Tsai et al.
2003/0181216 A1* 9/2003  Tsai et al. ..................... 455/517
2009/0131054 A1* 5/2009  Zhang .......................... 455/436
2009/0156257 A1  6/2009  Shi

FOREIGN PATENT DOCUMENTS

CN          101217747 A      7/2008

OTHER PUBLICATIONS

International Search Report and Written Opinion issued in corresponding International application No. PCT/EP2011/073677, date of mailing Feb. 22, 2012.

* cited by examiner

*Primary Examiner* — Justin Lee
(74) *Attorney, Agent, or Firm* — Patent Portfolio Builders PLLC (57) ABSTRACT There is described a multiple subscriber identity arrangement having a modem capable of receiving messages related to either one of at least two subscriber identities, but not simultaneously. The arrangement further comprises a control unit configured to, when the modem performs communication activity associated with a first subscriber identity: determine whether gaps not allocated for the communication activity associated with the first subscriber identity coincide with paging occasions associated with a second subscriber identity; and, if at least one gap not allocated for the communication activity associated with the first subscriber identity coincides with at least one paging occasion associated with the second subscriber identity, cause the modem to switch to the second subscriber identity to read one paging message on a paging channel associated with the second subscriber identity.

17 Claims, 3 Drawing Sheets

MULTI SIM MANAGEMENT

TECHNICAL FIELD

The present invention generally relates to devices and methods for the management of multiple Subscriber Identities (e.g. Multi SIM) in a terminal of a cellular telecommunication network. It concerns more particularly the management of paging reception for devices capable of receiving messages relating to two or more subscriber identities, but not simultaneously.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Mobile devices adapted for Multi SIM application are now becoming available to end users. A benefit of such mobile devices for the user is that the user should be able to receive calls on several subscriptions using a single device.

For example, a Dual SIM Dual Standby (DSDS) terminal comprises means for receiving/sending messages associated with at least two subscriber identities. The at least two subscriber identities may be associated with the same or different cellular networks, and may be using the same or different Radio Access Technologies (RAT).

However, typical DSDS mobile devices have generally only one radiofrequency (RF) module and/or only one baseband (BB) module, that can be shared by the two Subscriber Identities (SI) in Idle Discontinuous Reception (Idle-DRX) mode, but that are able to manage only one SI at each moment in time in idle no-DRX modes and in dedicated modes. Therefore, as soon as a SI is active (for signalling with the network, of or for voice call or packet transfer, for example), the other SI becomes out of range with respect to the network, typically leading to missed calls on said other SI. This limitation typically involves low performance of such devices in terms of Mobile Terminated (MT) call setup from the user point of view (i.e. a high missed call rate).

Indeed, it may seem acceptable for the user to miss an incoming call on one SI when using the DSDS mobile phone for an ongoing call on the other SI. Possibly it may also seem acceptable to miss an incoming call when using the DSDS mobile phone for other user initiated activities (e.g. web browsing) on the other SI. However, the user may also miss some MT call on one SI even though he did not trigger any specific activities on the other SI, for instance during a signalling procedure or when background activities generated by applicative frameworks are ongoing on the other SI.

Teaching in documents CN 101217747 and US 2009/013054 only addresses Paging Channel (PCH) reading when both SIMs are in idle mode.

Embodiments of the present invention will improve the equation.

SUMMARY

A first aspect of the present invention relates to a multiple subscriber identity arrangement comprising a modem and a control unit associated with said modem, wherein the modem is capable of receiving messages related to either one of at least first and second subscriber identities, but not simultaneously, and wherein the control unit is configured to, when communication activity associated with the first subscriber identity is being performed:

determine whether gaps not allocated for the ongoing communication activity associated with the first subscriber identity coincide with activity occasions associated with the second subscriber identity; and,
 if at least one gap not allocated for the communication activity associated with the first subscriber identity coincides with at least one activity occasion associated with the second subscriber identity, cause the modem to perform at least one activity associated wits the second subscriber identity in the at least one gap.

In some embodiments, the activity occasions may comprise paging occasions and the control unit may be configured to, if at least one gap not allocated for the communication activity associated with the first subscriber identity coincides with at least one paging occasion associated with the second subscriber identity, cause the modem to read at least one paging message on a paging channel associated with the second subscriber identity in the at least one gap.

In some embodiments, the activity occasions may comprise cell measurement occasions and the control unit may be configured to, if at least one gap not allocated for the communication activity associated with the first subscriber identity coincides with at least one cell measurement occasion associated with the second subscriber identity, cause the modem to perform cell measurements associated with the second subscriber identity in the at least one gap.

In some embodiments, the activities may relate to both paging and cell measurements. Cell measurements may e.g. include measuring signal strengths of a current cell and/or of neighbouring cells and/or other measurements needed for mobility management and/or cell synchronization.

Thus, available gaps in the ongoing activity on the first subscriber identity are used to monitor the paging channel associated with the second subscriber identity. If a PCH block received during such a gap contains a request for MT call setup on UE side, the modem may be controlled to stop the communication activities associated with the first subscriber identity and to answer the paging request by setting up a call according to parameters of the second subscriber identity. On the contrary, if no request for MT call setup is received on the paging channel associated with the second subscriber identity during the time window wherein it is monitored, then the modem may be controlled to resume the communication activity associated with the first subscriber identity.

The communication activity associated with the first subscriber identity may include background activity related to at least one signalling procedure. For instance, the signalling procedure may include at least one of Location Area Update (LAU) and Routing Area Update (RAU).

The communication activity associated with the first subscriber identity may also include background activity generated by at least one application running in at least one dedicated mode of operation associated with the first subscriber identity. For instance, the running application may include at least one of email retrieval, synchronization of email box, calendar and/or contacts, checking for news flash information, updating of reoccurring data such as weather forecast and/or financial data and software and/or security updates.

In some embodiments, the control unit is further configured to, when the paging message received on the paging channel associated with the second subscriber identity contains a call setup request cause the modem to interrupt the ongoing communication activities associated with the first subscriber identity and switch to the second subscriber identity to answer the call setup request.

In a variant the control unit may be configured to, when the paging message received on the paging channel associated with the second subscriber identity contains a call setup request:

a/ prompt the user and selectively cause the modem to interrupt the ongoing communication activities associated with the first subscriber identity and switch to the second subscriber identity to answer or not the call setup request responsive to an action by the user; or, b/ have an automated selection algorithm selectively cause the modem to interrupt the ongoing communication activities associated with the first subscriber identity and switch to the second subscriber identity to answer or not the call setup request; or c/ perform steps a/ for at least one some class of communication activities associated to the first subscriber identity and perform step b/ for at least another class of communication activities associated to the first subscriber identity.

In further embodiments, the control unit may be further configured to, when the call setup request is not answered, cause the modem to temporarily switch to the second subscriber identity and send a deny message to the network associated to the second subscriber identity.

Also, the control unit may be further configured to resume the communication activities associated to the first subscriber identities after the call associated with the second subscriber identity which has been answered is over.

The multiple subscriber identity arrangement may further comprise a paging schedule memory configured to have knowledge of a scheduling of paging occasions for each of the subscriber identities associated with the modem.

A second aspect of the present invention rotates to a mobile device comprising a multiple subscriber identity arrangement as defined above, and a reception/transmission block coupled to the modem of the multiple subscriber identity arrangement for receiving and/or transmitting signals.

A third aspect of the present invention relates to a method of data processing in a multiple subscriber identity arrangement having a modem and a control unit associated with said modem wherein the modem is capable of receiving messages related to at least two subscriber identities, but not simultaneously, the method comprising, when communication activity associated with the first subscriber identity is being performed, the control unit performing steps of:

determining whether gaps not allocated for the communication activity associated with the first subscriber identity coincide with paging occasions associated with the second subscriber identity; and, if at least one gap not allocated for the communication activity associated with the first subscriber identity coincides with at least one paging occasion associated with the second subscriber identity, cause the modem to read at least one paging message on a paging channel associated with the second subscriber identity.

A fourth aspect at the present invention relates to a computer program product comprising a computer readable medium, having thereon one or more stored sequences of instructions being loadable into a processor and adapted to cause, when executed by the processor, execution of the steps of the method.

It should be noted that embodiments of the invention are equally applicable to dual SIM devices and multiple SIM devices with three or even more subscriber identities.

Also, even though the subscriber identities typically reside in local memory areas of SIM cards which are physically inserted into corresponding SIM card readers in a mobile terminal, this must not be the case in all embodiments. In some embodiments, the subscriber identities may be provided to the mobile terminal in the form of a SIM software application executed in the terminal, and/or as a virtual SIM which is "stolen" or "borrowed" from another device and is rendered accessible to the terminal by way of a (wireless or other) interface.

Furthermore, it should be noted that embodiments of the invention are equally applicable to mobile terminals as to stationary devices associated with a cellular telecommunication network (e.g. routers, power consumption meters, home alarms, etc). Such stationary devices are configured to be connected to a cellular communication network and are, when connected, seen as terminals by the network.

BRIEF DESCRIPTION OF THE DRAWINGS

The present invention is illustrated by way of example and not by way of limitation, in the figures of the accompanying drawings, to which like reference numerals refer to similar elements and to which.

DESCRIPTION OF EMBODIMENTS

DSDS mobile phones behaviour is not described in any Standard. For this reason, DSDS mobile phones are typically based on e.g. the 3GPP Standard or any corresponding suitable standard. However, each standards do not describe use cases as the ones disclosed above and hence do not provide any solution to the problem of missed calls related a second SI when the first SI is performing communication (e.g. signalling or background activities).

Embodiments of the invention deal with improving the MT call setup rate from the end user point of view, within a mobile device with one single reception/transmission chain being able to operate at a time. In particular, embodiments of the invention deal with the problem of avoiding missed calls in DSDS mobile phones by reading PCH data blocks on one SI while the modem is performing background activities on the other SI, like signalling procedure or other activities not induced by the user.

Figure 1:
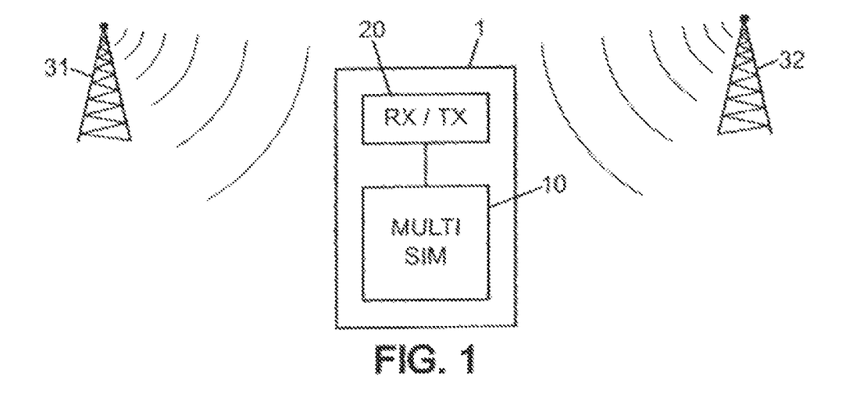
FIG. 1 is a schematic block diagram at a mobile device according to some embodiments of the invention.

FIG. 1 shows a mobile device 1, for example a mobile phone, according to possible embodiments. Mobile device 1 comprises a multi subscriber identity modem 10, for example a Dual SIM Dual Standby (DSDS) modem, and a single reception/transmission (Rx/Tx) block 20 adapted to receive and/or transmit signals in respect of only one subscriber identity (SI) at a time. The reception/transmission block 20 may comprise an antenna system, and a single radio transmitter (Tx) and a single radio receiver (Rx). There may be more Rx and/or Tx, but only one of them being operable at a time. In some embodiments, each limitation may stem from the fact that the Rx/Tx block of the mobile device comprises only one base band (SB) module.

In the following description of embodiments, we shall limit ourselves to consider one example where two subscriber identities are associated with two cellular networks. It is in no way intended to limit the scope of possible embodiments. Indeed, the at least two subscriber identities may be associated with the same or different cellular networks, and may be using the same or different Radio Access Technologies (RAT) as mentioned above. In some cases, each subscriber identity is defined by the content data stored in a Subscriber Identity Module (SIM), but other alternatives exist as also elaborated on above. However, for reasons of conciseness of the following description, a first and a second subscriber identity shall sometimes be referred to by SIM#1 and SIM#2, respectively.

FIG. 1 thus illustrates a use case considered here, wherein both a first base station 31 belonging to a first cellular network and a second base station 32 belonging to a second cellular network, are in the direct vicinity of the mobile device 1. Thus, modem 10 is capable of listening to the two cellular networks, selectively through either one of the fixed network equipments 31 or 32, respectively, but not simultaneously. In other words, modem 10 may receive or emit messages managed by the first cellular network, and (but not at the same time) receive or emit messages managed by the second cellular network, via the respective base stations 31 and 32.

Consequently, the mobile device 1 is obliged to slice its radio opening time between the different subscriber identities. Consequently, as soon as a subscriber identity is active (e.g. for signaling with the network, for voice call or packet transfer), the other subscriber identity becomes out of service with respect to the network.

In what follows, further, we shall consider situations where communication activities are being performed by the modem on any one of the subscriber identities, for example background activities or foreground activities. These two kinds of activities are to be understood as follows.

Foreground activities, such as an ongoing voice call, video call, web browsing or receipt of a live audio or video stream, are activities typically induced by the end user. A foreground activity is thus an activity which the user is very likely taking active part in.

On the contrary, background activities occur in the mobile device without any active participation by the user, and usually without the user being even aware of it. Examples of background activities are signaling procedures, like Location Area Update (LAU) and Routing Area Update (RAU). Other examples are applications running in dedicated modes, such as email retrieval, synchronization of email box, calendar and contacts, checking for news flash information updating current weather forecast and financial data, and software and security updates, etc. For instance, a background activity is an activity the interruption of which will not even be noticed the end user, or will not be considered as a drawback by the user compared with the advantage of not missing incoming calls on another subscriber identity.

Other definitions of foreground and background activities may be practiced within the scope of embodiments of the invention. For example, some non urgent activities (e.g. streaming of audio and/or video) may be defined as background activities by contrast with other more urgent activities (e.g. telephone calls) which shall then qualify as foreground activities.

Communication activities can generally be sorted into two or more classes, each of which may be given a priority in relation to the other classes. How the invention is practiced can then be based on the classes. For instance, paging messages may belong to a class which causes that it will always be listened to if at all possible, or only if the ongoing communication activity on the first SI is of a certain class. More generally, the line of action if a call setup request is received for the SIM#2 may depend on the class of ongoing activity on SIM#1 and/or on the class of requested activity on SIM#2.

Figure 2:
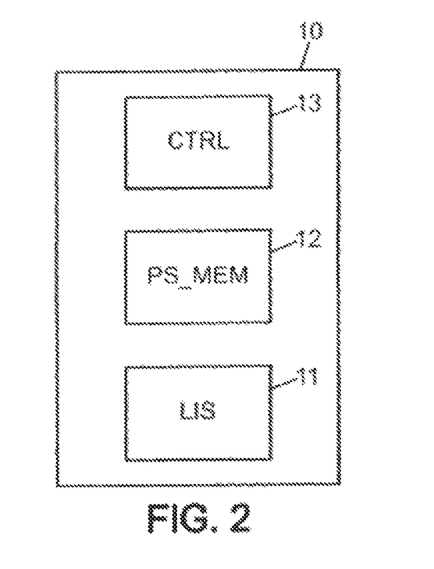
FIG. 2 is a schematic block diagram of a multi SIM modem according to some embodiments of the invention, that may be composed in a mobile device.

In the embodiment represented in FIG. 2, the modem 10 comprises a listening block 11 for listening to messages, for example paging messages and other signalling messages, associated with a plurality of different subscribers (from the same or a plurality of different cellular networks and/or using the same or a plurality of different Radio Access Technologies (RAT)). In this example, modem 10 further comprises a paging schedule memory 12 configured to have knowledge of a scheduling of the paging occasions for each of the subscriber identities associated with the modem. Such knowledge may encompass the radio parameters associated with the paging channel on SIM#1 and SIM#2, acquired e.g. when the modem is in idle mode on both SI. The modem 10 further comprises a control unit 13 configured to control the radio opening time for each subscriber identity, e.g. for monitoring radio communication physical and/or logical channels related to one subscriber identity at some given times and related to a second subscriber identity at other given times.

Figure 3:
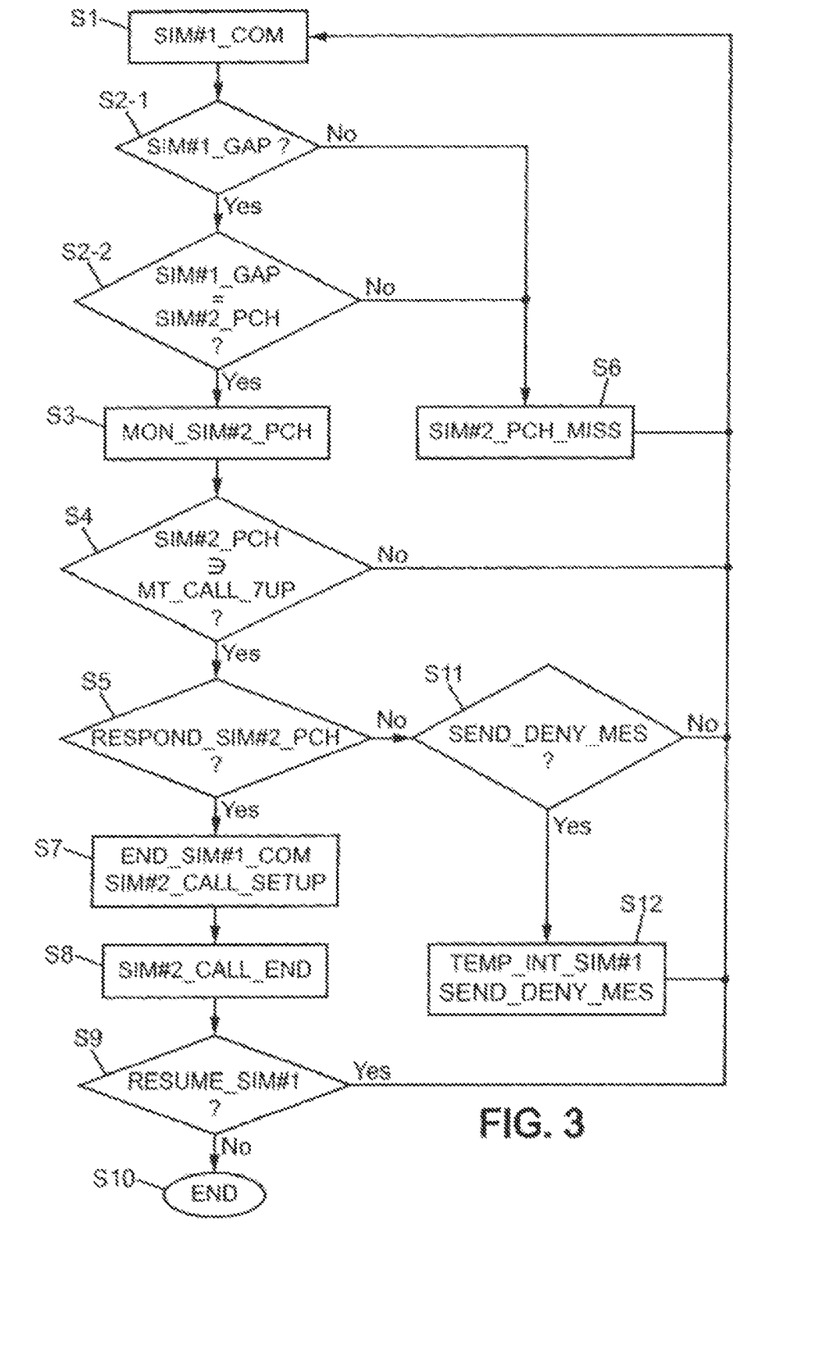
FIG. 3 is a flow chart showing steps of a method of managing the multi SIM modem, according to some embodiments of the invention; and, FIG. 4 and FIG. 5 are charts which show examples of use of gaps in the communication activity on one SI, which may be used for performing activities on the other SI according to some embodiments of the invention.

Referring to FIG. 3, there will be described steps of a method of controlling a deal subscriber identity modem according to some embodiments. However, the one with ordinary skills in the art will identify that the process herein described is also applicable to a modem supporting more than two subscriber identities, for instance:

when one the modem is active on one SI and several other SI need to listen to their respective paging channels;

when the modem in active on several SI using respective RF receivers and one further SI needs to listen to its paging channel (e.g. a 3-SIM phone with only 2 Rx); or, when the modem in active on several SI using respective RF receivers and several other SI need to listen to their respective paging channels.

In step S1 of FIG. 3, the modem performs any communication activities, e.g. background activities, on a first subscriber identity SIM#1. Examples of such activities may be the transmission or reception of signalling information to, respectively from the network associated with the first subscriber identity. Other examples pertain to the execution of background applications running on SIM#1.

In step S2-1, and while the activity on SIM#1 is ongoing, it is determined (e.g. by the control unit 13 of the modem 10) whether there are gaps in the communication activities on the first subscriber identity SIM#1. If there are such gaps, then, in step S2-2 if is determined whether theses gaps coincide with time slots of the Paging Channel (PCH) on the second subscriber identity SIM#2, i.e., with paging occasions associated with the second SI. This may, for example, be performed using data stored in the paging schedule memory 12 of the modem 10. More precisely, step S2-1 may comprise the control unit determining whether there are available gaps in the activity on SIM#1, and S2-2 may comprise the control unit determining whether at least some of these gaps could be used for performing activities associated with SIM#2, particularly but not exclusively PCH reading on SIM#2. At step S2-2, the modem control unit 13 may thus check the SIM#2 PCH timing position versus the SIM#1 gaps.

If the tests of steps S2-1 and S2-2 are positive, then the algorithm jumps to step S3. Else, at step S6, it is concluded that the SIM#2 paging message cannot be read, and the algorithm returns to step S1.

Step S3 is performed if it is determined at steps S2-1 and S2-2 that at least one SIM#2 PCH data block matches with at least one SIM#1 gap, i.e., that at least one time slot of the SIM#2 Paging channel coincides with one available gap on SIM#1.

At step S3, the modem 10 is controlled by the control unit 13 to temporarily switch to SIM#2 during at least one gap in the communication activities on SIM#1 which coincides with at least one PCH time slot on SIM#2 and to monitor the paging channel of SIM#2 during said time slot, to read a PCH block associated with the second subscriber activity.

At step S4, it is then determined whether a received PCH block contains a request for MT call setup on User Equipment (UE) side.

If yes, step S5 may offer to possibility to determine whether the call is to be responded on SIM#2. If yes, then the process continues with step S7, otherwise it continues with step S11. Step S5 may be carried out according to several alternatives.

Indeed, when there is an incoming call in SIM#2, control unit may be configured to:
  prompt the user and allow him to decide whether or not to interrupt the communication activities ongoing on SIM#1 to answer the SIM#2 incoming call, e.g. through an appropriate user interface of the mobile phone; or,
  cause an automated selection algorithms (e.g. based on categorising communication types into different priorities) decide whether or not to interrupt the communication activities ongoing SIM#1 to answer the cell on SIM#2; or
  combine the two above alternatives (e.g. ask the user for some classes of SIM#1 communication activities and select automatically for other classes).

For example, there might be provided a setting in the phone to let the user decide whether or not, and such being the case for which classes of activities, the packet transfer for the activities on one SI shall be interrupted by any call on the other S1. In a variant, the phone may have it hard coded to always apply one of the above scheme.

If it is decided at step S5 not to respond to the paging request on SIM#2, it may be blocked at step S11 whether or not to at least send a deny message to the network associated to SIM#2, so that said network does not have to repeat the paging request over and over again.

If it is decided not to send a page denial message, then the algorithm returns to step S1, otherwise, at step S12, a short interruption of SIM#1 activity may be performed (unless the gap or another available gap can also be utilized for sending the page denial message) and the page denial message sent to the network associated to SIM#2. Then the process returns back to step S1 to resume communication activities on SIM#1.

If, on the contrary, it is decided at step S5 to respond to the paging request on SIM#2, then, at step S7, the communication activities on SIM#1 are ended and a call setup is performed on SIM#2 according to parameters of the second subscriber identity. Then, the algorithm continues with step S8.

At step S8, the communication activities on SIM#2 reach an end when the received call is over.

At step S9, it may be determined whether or not to resume the communication activities on SIM#1. This may be particularly useful for background activities like the downloading of software updates or re-occurring information like weather forecast information. If yes the process returns to step S1, else it ends up at step S10.

It will become apparent to the one with ordinary skills in the art that handling of an incoming call in respect of the second subscriber identity is not guaranteed. Indeed, if it is determined at step S2-1 that there is no available gap in the SIM#1 activity or, if it is determined at step S2-2 that there is no match between one such gap and any PCH time slot on SIM#2, then the PCH of SIM#2 may never be read an thus a MT call request may still be ignored. However, there will definitely be some cases where implementation of the proposed method will end up with a MT call request on SIM#2 being answered, despite the modem being active for (e.g. background) tasks associated with the first subscriber identity.

In other words, embodiments of this invention allow improving MT call setup rate on DSDS mobile phones, because incoming calls in respect of the second subscriber identity are less likely to be missed for the reason that the multiple subscriber identity modem is performing activities in respect of the first subscriber identity.

Figure 4:
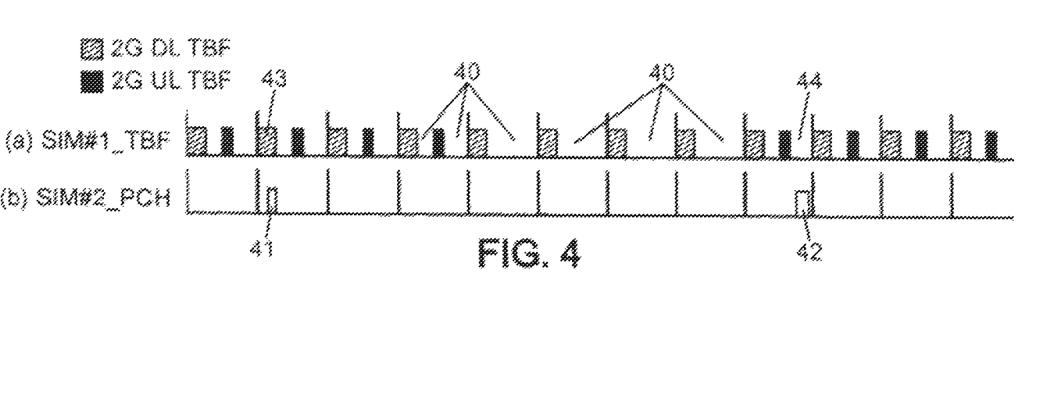
Figure 5:
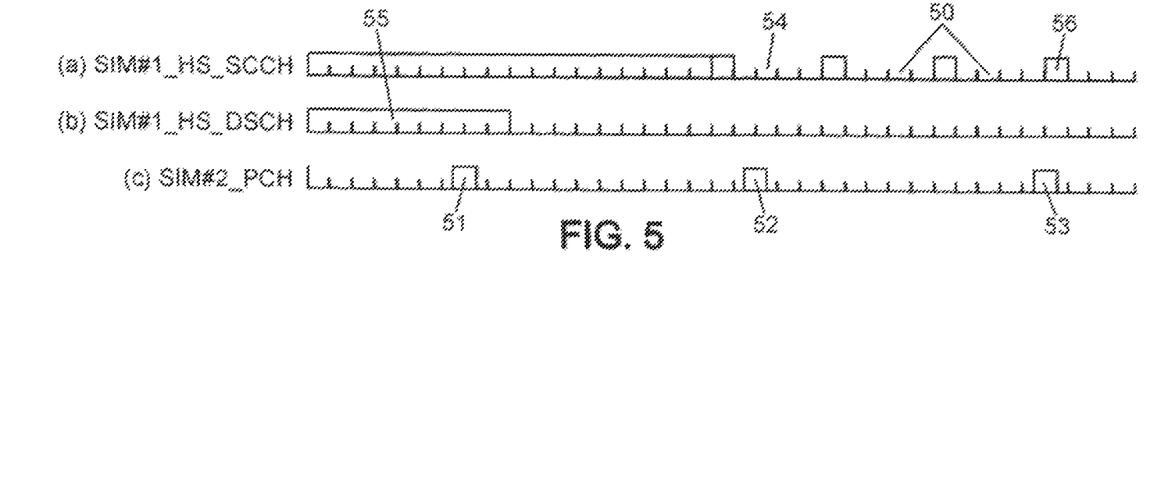

With reference to FIG. 4 and FIG. 8, there will now be given two examples of implementation of the method according to embodiments of the invention, in the context of a mobile radio communication system of second generation (2G) and in the context of third generation partnership project (3GPP) Wideband-Code Division Multiple Access (W-CDMA) mobile radio communication system, respectively. These examples are not in any way intended to limit the scope of possible embodiments, and many other use cases may be considered wherein such embodiments will prove advantageous as well.

FIG. 4 illustrates an example of use of gaps 40 between two consecutive blocks of Packet Data Traffic Channel. The Packet Data Traffic Channel (PDTCH) is a channel allocated for data transfer in 2G mobile radio communication systems.

In the context of FIG. 4, we assume that the modem is in a PDTCH dedicated mode in respect of the first subscriber identity (SIM#1). In this dedicated mode of operation, it is performing PDTCH monitoring on SIM#1, for instance for mail reading. This mode of operation is triggered by a background application configured by the end-user but whose action is not launched by the end-user, and which therefore qualifies as background activity in the sense as defined above.

In one example, one downlink (DL) Temporary Block Flow (TBF) may be assigned to SIM#1 with two time slots per PDTCH frame, and one uplink (UL) TBF is assigned to SIM#1 with one time slot per PDTCH frame. In the figure, consecutive PDTCH frames are delimited by vertical lines.

In FIG. 4(a), active time slots on SIM#1 are represented with dots for the DL TBF activities and with hachure for the UL TBF activities. PCH activities of SIM#2, i.e., paging occasions on SIM#2 and their timing positions are represented in FIG. 4(b). Activities on SIM#1 do not use all slots at the PDTCH frame so that, in between DL and UL TBF, PCH reading can be performed when possible during free time slots or gaps 40.

Thus, the first PCH block 41 of SIM#2 cannot be read due to a conflict with SIM#1 activity, namely with receipt of the downlink Temporary Block Flow 43.

However, the second PCH blocs 42 of SIM#2 is not in conflict with any DL TBF or UL TBF pertaining to SIM#1 activity. Therefore, according to embodiments of the invention, the modem is allowed to read this PCH block 42 during a gap 44. If this PCH block contains a request for MT call setup on User equipment (UE) side, then the modem is controlled to stop activities on SIM#1 and to answer to SIM#2 paging.

Let us now turn to the example illustrated by FIG. 5, which illustrates another example of application for use with the High-Speed Downlink Packet Access (HSDPA) of the 3GPP W-CDMA communication system. HSDPA is a transport layer channel, which has been added into the W-CDMA Release 5 Specifications. It is an enhanced third generation (3G) mobile telephony communication protocol in the High-Speed Packet Access (HSPA) family, also dabbed 3.5G, 3G+ or turbo 3G, which allows networks based on Universal Mobile Telecommunication Systems (UMTS) to have higher data transfer speeds and capacity. In this application, it is made use of a gap between two HSDPA blocks.

In the context of FIG. 5, we assume that the modem is active for receiving HSPDA data blocks in respect of the first subscriber identity SIM#1. FIG. 5(*a*) shows activity on the High Speed Shared Control Channel (HS-SCCH) and FIG. 5(*b*) shows activity on the High-Speed Physical Downlink Shared Channel (HS-PDSCH) of the HSPDA channel, related to ongoing background activities associated with the first subscriber identity (referred to as "SIM#1_HS-SCCH" and as "SIM#1_HS-DSCH", respectively, in the figure). FIG. 5(*c*) shows data blocks of the paging channel of the network associated with the second subscriber identity (referred to as "SIM#2_PCH" in the figure).

The first PCH block 51 appearing in FIG. 5(*c*) cannot be read due to conflict with reception of a HSPDA block 55 on the downlink HS-DSCH depicted in FIG. 5(*b*). Gaps 50 occur when no HSPDA data blocks are received, neither in the downlink HS-DSCH nor in the downlink HS-SCCH for activities associated with the first subscriber identity. Thus, a downlink discontinuous receiver (DL DRX) may be activated for the second subscriber identity (SIM#2), and allows reading the second PCH block 52 of SIM#2 PCH during one such gap 54 occurring in the SIM#1 activities. On the contrary, the third PCH block 53 of SIM#2 PCH cannot be read due to conflict with another HSDPA block 56 on DL HS-SCCH.

Whereas some specific examples of gaps in the activity of the modem associated to the first subscriber identity have been given above, the one with ordinary skills in the art will not fail to consider other gaps, depending on the radio communications network and/or RAT concerned. A non exclusive list of examples may comprise the followings options for the gaps:

- GSM (Global System for Mobile) free slots not allocated for the first subscriber identity;
- TD-SCDMA (Time Division Synchronous Code Division Multiple Access) free slots;
- free sub-frames left by Idle-DFX CPC 3GPP R7 (Discontinuous Reception Continuous, Packet Connectivity, 3$^{rd}$ Generation Partnership, Project, Release 7) feature;
- compressed mode gaps allocated to the first subscriber identity;
- FACH (Forward Access Channel) measurement occasion gaps allocated to the first subscriber identity;
- gaps between PDTCH TBF (Packet Data Traffic Channel, Temporary Block Flow) as illustrated by FIG. 4 described above; and,
- gaps between HSDPA (High-Speed Downlink Packet Access) blocks of the 3GPP W-CDMA (3GPP Wideband-Code Division Multiple Access) communication system as illustrated by FIG. 5 described above.

The present invention can also be embedded in a computer program product, which comprises all the features enabling the implementation of the methods described herein, and which—when loaded in an information processing system— is adapted to cause the information processing system to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are its explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A multiple subscriber identity arrangement comprising a modem and a control unit associated with said modem, wherein the modem is receives messages related to either one of at least first and second subscriber identities, but not simultaneously, and wherein the control unit is configured to:
    perform an ongoing communication activity associated with the first subscriber identity, wherein when the ongoing communication activity associated with the first subscriber identity is being performed the control unit is configured to
        determine whether gaps not allocated for the ongoing communication activity associated with the first subscriber identity currently being performed coincide with activity occasions associated with the second subscriber identity; and
        if at least one gap not allocated for the ongoing communication activity associated with the first subscriber identity currently being performed coincides with at least one activity occasion associated with the second subscriber identity, cause the modem to perform at least one activity associated with the second subscriber identity in the at least one gap.

2. The multiple subscriber identity arrangement of claim 1, wherein the activity occasions associated with the second subscriber identity comprise paging occasions and wherein the control unit is configured to, if at least one gap not allocated for the ongoing communication activity associated with the first subscriber identity coincides with at least one paging occasion associated with the second subscriber identity, cause the modem to read at least one paging message on a paging channel associated with the second subscriber identity in the at least one gap.

3. The multiple subscriber identity arrangement of claim 2, wherein the control unit is further configured to, when the paging message received on the paging channel associated with the second subscriber identity contains a call setup request cause the modem to interrupt the ongoing communication activities associated with the first subscriber identity and switch to the second subscriber identity to answer the call setup request.

4. The multiple subscriber identity arrangement of claim 2, wherein the control unit is further configured to, when the paging message received on the paging channel associated with the second subscriber identity contains a call setup request:
   (a) prompt the user and selectively cause the modem to interrupt the ongoing communication activities associated with the first subscriber identity and switch to the second subscriber identity to answer or not the call setup request responsive to an action by the user; or
   (b) have an automated selection algorithm selectively cause the modem to interrupt the ongoing communication activities associated with the first subscriber identity and switch to the second subscriber identity to answer or not the call setup request; or
   (c) perform steps (a) for at least one some class of communication activities associated to the first subscriber identity and perform step (b) for at least another class of communication activities associated to the first subscriber identity.

5. The multiple subscriber identity arrangement of claim 4, wherein the control unit is further configured to, when the call setup request is not answered, cause the modem to temporarily switch to the second subscriber identity and send a deny message to the network associated to the second subscriber identity.

6. The multiple subscriber identity arrangement of claim 2, wherein the control unit is further configured to resume the ongoing communication activities associated to the first subscriber identities after the call associated with the second subscriber identity which has been answered is over.

7. The multiple subscriber identity arrangement of claim 2, further comprising a paging schedule memory configured to have knowledge of a scheduling of paging occasions for each of the subscriber identities associated with the modem.

8. The multiple subscriber identity arrangement of claim 1, wherein the gaps not allocated for the ongoing communication activity associated with the first subscriber identity include at least one of: GSM (Global System for Mobile) free slots not allocated for the first subscriber identity, TD-SCDMA (Time Division Synchronous Code Division Multiple Access) free slots, free sub-frames left by Idle-DRX CPC 3GPP R7 (Discontinuous Reception Continuous, Packet Connectivity, $3^{rd}$ Generation Partnership Project, Release 7) feature, compressed mode gaps allocated to the first subscriber identity, FACH (Forward Access Channel) measurement occasion gaps allocated to the first subscriber identity, gaps between PDTCH TBF (Packet Data Traffic Channel, Temporary Block Flow), and gaps between HSDPA (High-Speed Downlink Packet Access) blocks of the 3GPP W-CDMA (3GPP Wideband-Code Division Multiple Access) communication system.

9. The multiple subscriber identity arrangement of claim 1, wherein the ongoing communication activity associated with the first subscriber identity is a background communication activity and no foreground communication activity associated with the first subscriber identity is performed while the control unit determines whether gaps are not allocated and causes the modem to perform the at least one activity associated with the second subscriber identity.

10. A mobile device associated with at least first and second subscriber identities and comprising:
   a modem receives messages related to either one of at least first and second subscriber identities, but not simultaneously;
   a reception/transmission block coupled to the modem and configured to receive and/or transmit signals; and
   a control unit associated with said modem, wherein the control unit is configured to:
      perform an ongoing communication activity associated with the first subscriber identity, wherein when the ongoing communication activity associated with the first subscriber identity is being performed the control unit is configured to
         determine whether gaps not allocated for the ongoing communication activity associated with the first subscriber identity currently being performed coincide with activity occasions associated with the second subscriber identity; and
      if at least one gap not allocated for the ongoing communication activity associated with the first subscriber identity currently being performed coincides with at least one activity occasion associated with the second subscriber identity, cause the modem to perform at least one activity associated with the second subscriber identity in the at least one gap.

11. The mobile device of claim 10, wherein the ongoing communication activity associated with the first subscriber identity is a background communication activity and no foreground communication activity associated with the first subscriber identity is performed while the control unit determines whether gaps are not allocated and causes the modem to perform the at least one activity associated with the second subscriber identify.

12. A method of data processing in a multiple subscriber identity arrangement having a modem and a control unit associated with said modem wherein the modem is receives messages related to at least two subscriber identities, but not simultaneously, the method comprising:
   performing an ongoing communication activity associated with the first subscriber identity, wherein when the ongoing communication activity associated with the first subscriber identity is being performed, the control unit performs the steps of
      determining whether gaps not allocated for the ongoing communication activity associated with the first subscriber identity currently being performed coincide with activity occasions associated with the second subscriber identity; and
      if at least one gap not allocated for the ongoing communication activity associated with the first subscriber identity currently being performed coincides with at least one activity occasion associated with the second subscriber identity, causing the modem to perform at least one activity associated with the second subscriber identity in the at least one gap.

13. The method of claim 12, wherein the activity occasions associated with the second subscriber identity comprise paging occasions, the method comprising, if at least one gap not allocated for the ongoing communication activity associated with the first subscriber identity coincides with at least one paging occasion associated with the second subscriber identity, causing the modem to read at least one paging message on a paging channel associated with the second subscriber identity in the at least one gap.

14. The method of claim 13 wherein, when the paging message received on the paging channel associated with the second subscriber identity contains a call setup request, the modem interrupts the ongoing communication activities associated with the first subscriber identity and switch to the second subscriber identity to answer the call setup request.

15. The method of claim 14 wherein, when the paging message received on the paging channel associated with the second subscriber identity contains a call setup request, the control unit:
   (a) prompts the user and selectively cause the modem to interrupt the ongoing communication activities associated with the first subscriber identity and switch to the second subscriber identity to answer or not the call setup request responsive to an action by the user; or
   (b) has an automated selection algorithm selectively cause the modem to interrupt the ongoing communication activities associated with the first subscriber identity and switch to the second subscriber identity to answer or not the call setup request; or
   (c) performs steps (a) for at least one some class of communication activities associated to the first subscriber identity and perform step (b) for at least another class of communication activities associated to the first subscriber identity.

16. The method of claim 15 wherein, when the call setup request is not answered, the control unit causes the modem to temporarily switch to the second subscriber identity and send a deny message to the network associated to the second subscriber identity.

17. The method of claim 12, wherein the ongoing communication activity associated with the first subscriber identity is a background communication activity and no foreground communication activity associated with the first subscriber identity is performed while the control unit determines whether gaps are not allocated and causes the modem to perform the at least one activity associated with the second subscriber identify.

* * * * *